Figure 1:
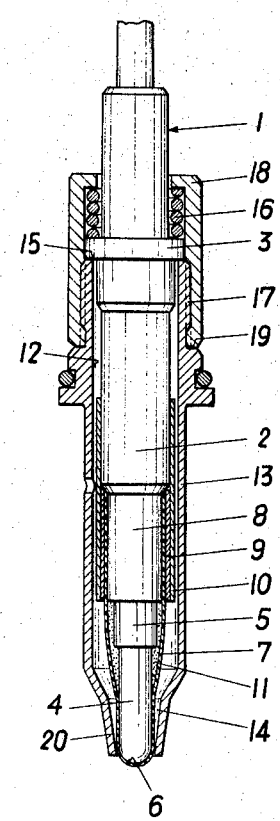

United States Patent [19]

Harnoncourt et al.

[11] 3,723,280
[45] Mar. 27, 1973

[54] ELECTRODE ARRANGEMENT FOR THE MEASUREMENT OF PARTIAL PRESSURES OF GASES

[75] Inventors: Karl Harnoncourt; Rudolf Zeiringer, both of Graz, Austria

[73] Assignee: Hans List, Graz, Austria

[22] Filed: Nov. 25, 1970

[21] Appl. No.: 92,683

[30] Foreign Application Priority Data

Dec. 4, 1969 Austria............................A 11343/69
Sept. 3, 1970 Austria............................A 8040/70

[52] U.S. Cl.............................................204/195 P
[51] Int. Cl........................G01n 27/30, G01n 27/40
[58] Field of Search....204/195 P, 195 M, 17; 324/29

[56] References Cited

UNITED STATES PATENTS

| | | | |
|---|---|---|---|
| 3,325,378 | 6/1967 | Green et al. | 204/1 T |
| 3,098,813 | 7/1963 | Beebe et al. | 204/195 P |
| 3,259,124 | 7/1966 | Hillier et al. | 204/195 P X |
| 3,575,836 | 4/1971 | Sternberg | 204/195 P |
| 3,432,418 | 3/1969 | Kleiss | 204/195 P |

Primary Examiner—G. L. Kaplan
Attorney—Watson, Cole, Grindle & Watson

[57] ABSTRACT

An electrode arrangement for the measurement of partial pressures of gases such as carbon dioxide and oxygen for analysis of blood gases and in which the electrode has a sensitive extremity covered by a liquid-proof membrane permeable to gases and a reference electrode arranged in spaced relation to the sensitive extremity and electroconductively connected therewith by means of an electrolytic layer.

5 Claims, 4 Drawing Figures

PATENTED MAR 27 1973 3,723,280

Inventors
Karl Harnoncourt
Rudolf Zeiringer
By Watson, Cole, Grindle & Watson
Att'ys.

ELECTRODE ARRANGEMENT FOR THE MEASUREMENT OF PARTIAL PRESSURES OF GASES

The invention relates to an electrode arrangement for the measurement of partial pressures of gases particularly for the measurement of the partial pressures of carbon dioxide and/or oxygen in connection with the analysis of the blood gases, comprising an electrode, the sensitive extremity of which is covered by a liquid-proof membrane which is, however, permeable to gases and a reference electrode arranged in spaced relation to the said sensitive extremity and electroconductively connected with the sensitive extremity of the electrode by means of an electrolytic layer.

Examples of this type of electrodes are the electrode after Severinghaus generally used in connection with the analysis of blood gases for the measurement of the partial pressure of carbon dioxide or the electrode after Clark for the measurement of the partial pressure of oxygen. However, the trouble with these known electrodes are the considerable difficulties encountered in the production of an extremely thin electrolytic layer to provide an electrically conductive connection between the sensitive surface of the electrode and the reference electrode. According to a known method, the sensitive extremity of similar electrodes used to be manually coated with an intermediate layer serving as an electrolyte carrier and then covered with the membrane. During the assembly of the measuring apparatus, these electrodes are usually pressed with their coated portion against a sealing surface in such a manner that the sensitive extremity protrudes into the measuring chamber.

Experience demonstrates that in conventional electrode arrangements usually tedious tuning operations by highly skilled operators are required to obtain consistency of measuring values over any length of time with the interchangeability of electrodes. Unless extreme care is used in the performance of these operations, the inaccuracy of measurements will be such as to render the practical usefulness of this analysis method highly problematic.

One of the main difficulties inherent in conventional electrode arrangements is due to the necessity of uniformly applying the membrane to the intermediate layer serving as an electrolyte carrier. Such uniform application is indispensable if identical measuring results are to be expected from a plurality of electrodes so as to assure interchangeability of these electrodes.

Another drawback of conventional electrode arrangements resides in the fact that as a result of the application of the membrane to a sealing surface during the installation of the electrodes in the measuring apparatus, the additional pressure applied to the membrane is bound to produce an alteration of the thickness of the electrolytic layer. As a result, the measuring properties of the electrode will be altered during the assembly, calling for a renewal of tuning operations following each installation of electrodes or whenever the installation pressure is otherwise modified. Finally, the additional mechanical stress to which the membrane is thus subjected will result in a substantial shortening of its service life. Consequently, the electrodes will have to be re-coated at comparatively brief intervals.

Besides, in conventional electrode arrangements insufficient tightness of the chamber containing the electrolytic liquid necessitates repeated electrolyte refills or renewals. In order to maintain the electrodes in serviceable condition, it is therefore, necessary to provide for permanent care and surveillance. Unless carefully attended to, the electrodes will become unserviceable due to desiccation.

It is the object of the invention to provide an electrode arrangement offering a uniformly high standard of measuring properties over a considerable period of time and of a design which is suitable for serial production. Likewise, the measuring properties of the individual electrodes should be identical among themselves so as to be interchangeable without any complicated tuning operations. Furthermore, the installation of the electrodes should be easy enough for even unskilled operators to be able to exchange the electrodes if necessary. Finally, the electrodes should be such as to preclude any damage to them or impairment of their measuring properties even in the event of frequent exchanges.

According to the invention this problem is solved by arranging an electrode carrier in the stepped axial bore of a housing closely encompassing the same, and by extending the membrane over and above the reference electrode as far as the shaft of the electrode carrier located in an enlarged section of the housing bore, and mounting it hermetically sealed with its inner extremity on the electrode carrier or on the housing in such a manner as to provide a bag containing the electrolytic liquid and extending from the sensitive end of the electrode as far as the point where the membrane is fixed to the electrode carrier or to the housing.

This design ensures an absolutely dependable sealing of the chamber containing the electrolyte against the outside, thereby providing an entirely positive and durable electrolytic connection between the sensitive end of the electrode and the reference electrode, the electrode carrier with its housing forming a compact unit which is largely insensitive to external influences. At the same time, this protective arrangement of the sensitive extremity precludes any alteration of the measuring properties during the installation of the electrode unit in the measuring instrument. As a result, maintenance of the electrode arrangement may be almost entirely dispensed with, without, however, impairing the accuracy of measurements.

According to a preferred embodiment of the invention, the inner end of the membrane is pulled over part of the electrode carrier shaft and attached thereto by means of a collar, thread or the like surrounding the end of the membrane and preferably secured by means of a sleeve slid thereon in such a manner as to provide positive sealing. With this design, insulation troubles are avoided between the fluid (blood) to be measured and the electrolytic liquid even in the event of a leakage occurring at the junction between the electrode-carrier-cum-membrane and the housing. In this embodiment of the invention it is particularly easy to install the covered electrode carrier in the housing.

According to another embodiment of the invention, the inner end of the membrane is pulled over a tubular extension of the housing and attached thereto by gluing and/or by means of a collar surrounding the extremity of the membrane in such a manner as to provide positive sealing. This design is particularly convenient as it involves considerable simplification of the assembling job. In particular, the filling of the bag formed by the membrane with a predetermined amount of electrolytic liquid is thereby simplified and accelerated.

In accordance with another feature of the invention, the membrane bag comprises a connecting member designed as a nondeformable cylindrical sleeve which can be attached to an offset portion of electrode carrier shaft or of the housing in such a manner as to provide a positive seal.

Thus the assembling operations which have to be performed whenever a leakage occurs in the delicate and thin membrane or when the thin electrolytic layer dries up or undergoes chemical changes in operation, are reduced in numbers to a few simple manipulations not requiring particular skill and easily carried out by the operator himself. All he has to do is remove the defective membrane bag and replace it by a spare bag which the operator should always be careful to carry in stock. The new membrane bag with its electrolytic filling is attached to the offset portion of the electrode carrier shaft or of the housing by simply sliding its connecting member to the said offset in such a manner as to provide a positive seal. Since the connecting member is a nondeformable cylindrical sleeve, the risk of damaging the sensitive membrane during the assembling operation is practically non-existant. At the same time, alteration of the measuring qualities of the electrode arrangement as a result of the exchange of membranes is positively avoided.

According to a further feature of the invention applied in connection with the last-mentioned electrode arrangement, the cylindrical sleeve is conveniently cast integral with the membrane so as to provide a one-piece element tapering off in the direction of the sensitive end of the electrode. Such a cast or molded body is easy to produce and always ready for use provided it has been appropriately stored.

According to a further feature of the invention, the cylindrical sleeve can also be made as a separate member from a highly resistant material, such as from plastics, for example, to which the membrane is attached in such a manner as to provide a positive seal. The particular advantage of this design resides in the greater rigidity of the connecting member of the membrane unit which further diminishes the risk of damaging the membrane during an exchange.

According to another embodiment of the invention used in connection with the last-mentioned design, the cylindrical sleeve is provided with an annular groove on its surface into which the inner end of the membrane is inserted and attached to the sleeve by means of a thread or the like so as to provide a positive seal. The hermetic attachment of the sleeve to the membrane can be performed by the manufacturer in serial production thereby saving the operator the trouble of providing this attachment himself.

According to the invention the offset portion of the electrode carrier shaft or the housing carrying the cylindrical sleeve is of a larger diameter than the internal diameter of the sleeve in order to ensure a press fit for the latter. Consequently, no additional provision for the sealing of the point where the membrane bag is attached to the electrode carrier or housing is required since the press fit provides a positive seal at this point.

Finally it is advisable, according to yet another feature of the invention, to provide the offset portion of the electrode carrier shaft or of the housing carrying the cylindrical sleeve with circumferential grooves which taper off in the direction of the sensitive end of the electrode. This design improves the sealing of the junction and positively secures the membrane unit to the offset portion of the electrode carrier shaft or of the housing.

Figure 2:
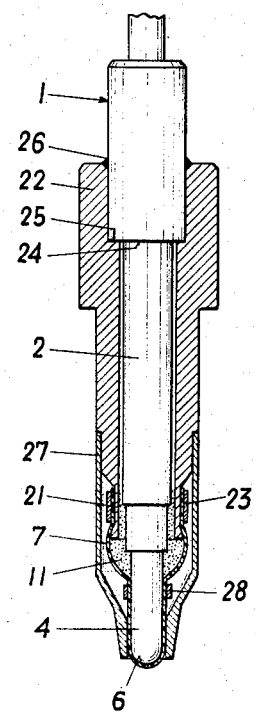
Figure 3:
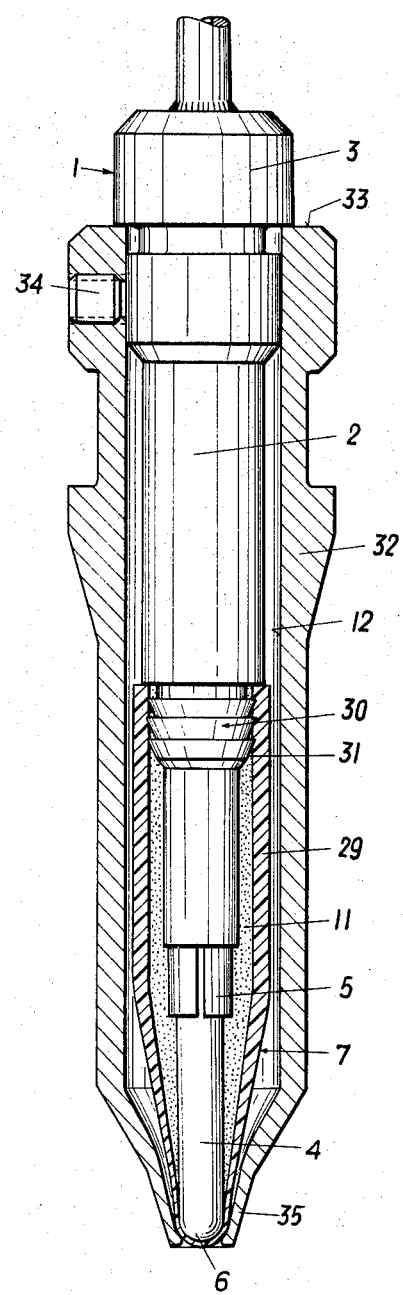
Figure 4:
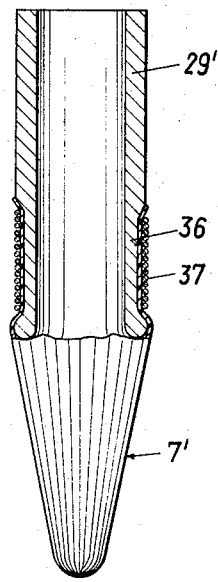

Further details of the invention will appear from the following description of several embodiments of the invention with reference to the accompanying drawings in which:

FIG. 1 shows a longitudinal cross-section of an electrode arrangement according to the invention, FIG. 2 is another longitudinal cross-sectional view of another embodiment of the invention, FIG. 3 is a longitudinal cross-section of a further variant of the electrode arrangement according to the invention, and FIG. 4 is a detail of the variant shown in FIG. 3.

The completely assembled electrode unit according to the invention as shown in FIG. 1 comprises an electrode carrier 1 having an essentially cylindrical shaft 2 with an annular flange 3 and carrying a rod-shaped electrode 4 over which a sleeve-like reference electrode 5 is pulled, the sensitive surface 6 of the first-mentioned electrode being formed by its rounded-off outer extremity.

The electrode 4 is covered by a membrane 7 which is impermeable to liquids but permeable to gases and extends in the shape of a bag in the direction towards the shaft 2 of the electrode carrier 1 with its open inner end pulled over a narrowed cylindrical portion 8 of the shaft 2. The membrane 7 is secured to the shaft 2 by means of a collar 9 encompassing its inner end and made of rubber, for example, and occasionally replaced by a binding twine, in such a manner as to provide a hermetic sealing. A sleeve 10 pushed over the collar 9 serves to secure the fastening point against any tendency to work loose.

The space defined by the membrane is filled with a liquid electrolyte 11 thus establishing an electrolytic connection between the sensitive extremity 6 of the electrode 4 and the reference electrode 5.

The electrode carrier 1 is inserted in an offset axial bore 12 of a housing 13, the covered electrode 4 protruding through the narrowed portion 14 of the housing bore 12 slightly over and above the front edge of the housing. A sealing means introduced in the bore 14 provides a positive seal for the covered membrane 4 at this point of the housing 13.

The annular flange 3 of the electrode carrier 1 adjoins with its inner annular surface the front face 15 of the housing 13. At its outer annular surface a pressure spring 16 engages, the other extremity of which is supported by the bottom surface of a cap screw 18 screwed onto an external thread 17 of the housing 13, a collar 19 of the housing constituting an abutment when the cap screw 18 is tightened. The interposition of the pressure spring 16 provides a uniform pressure applied by the annular flange 3 to the housing front 15, so that even a firm tightening of the cap screw will in no way alter the position of the electrode carrier in the housing.

On the side of the sensitive electrode end, the housing 13 terminates in a tapered projection 20 whose aperture angle must register with the conical receiving aperture of the measuring instrument (not shown) so as to ensure positive sealing at the measuring point without having to resort to a sealing member.

In the electrode arrangement as shown in FIG. 2 the inner end of the membrane 7 is pulled over a tubular extension 21 of the stepped cylindrical housing 22 and secured thereto by means of a collar 23 surrounding the end of the membrane in such a manner as to provide effective sealing. The membrane 7 might be attached to the housing extension 21 also by mere gluing.

The electrode carrier 1 inserted in the housing 22 rests with a shoulder 24 on an onset 25 of the housing 22 and is connected therewith by means of a circular gluing seam 26 in such a manner as to provide a hermetic sealing. According to this embodiment of the invention the electrolytic liquid 11 fills not only the space enclosed by the membrane 7 but also the interstice between the shaft 2 of the electrode carrier 1 and the housing 22.

In order to protect the covered electrode 4, an off-set cylindrical sleeve 27 is provided, which is slid on the housing 22, the covered probe surface 6 of the electrode 4 protruding slightly through its lower aperture. A ring 28, made of rubber, for example, surrounds the membrane 7 in the area of the tapered end of the said sleeve 27, so that the membrane closely encompasses the electrode 4 in this area.

For the assembly of the electrode carrier according to FIG. 2 the membrane is first encompassed bag-fashion, then placed with its open end directly around the housing extension 21 and attached thereto either by means of a collar 23 or by gluing in such a manner as to provide a positive seal. Thereupon the electrolytic liquid 11 is poured into the bag formed by the membrane 7 and then the electrode carrier 1 is pushed into the housing 22 from the side opposite the membrane 7, the membrane 7 tightly encompassing the sensitive end of the electrode 4. Any electrolytic liquid in excess of the required amount is allowed to emerge through the gap between the housing 22 and the electrode carrier 1. Finally, the electrode carrier 1 is connected with the housing by means of a circumferential gluing seam 26 in such a manner as to produce a hermetic seal. After the rubber ring 28 has been shrunk onto the bag-shaped membrane, the sleeve 27 is slid onto the housing 22.

In the electrode arrangement shown in FIG. 3 the bag-shaped membrane 7 changes over into a cylindrical sleeve 29 serving as a connecting member approximately in the area of the reference electrode 5. The inner end of the cylindrical sleeve 29 is shrunk onto an offset 30 of the electrode carrier shaft 2 provided with circumferential grooves 31 tapering off in the direction of the sensitive end 6 of the electrode 4 so as to produce a spout of sorts. The external diameter of the offset 30 is somewhat larger than the internal diameter of the cylindrical sleeve 29 so as to ensure an hermetically tight seat of the sleeve 29 on the offset 30.

The space enclosed by the membrane assembly 7, 29 is filled with a liquid electrolyte 11 providing an electrolytic connection between the sensitive end 6 of the electrode 4 and the reference electrode 5.

The electrode carrier 1 is inserted in the axial receiving bore 12 of a housing 32 and abuts with its annular flange 3 against the annular front 33 of the housing. The electrode carrier 1 is secured in the housing 32 by means of a clamp screw 34.

The housing 32 with its tapered extension 35 is insertable into the conical receiving bore of the measuring instrument (not shown). The covered end of the electrode 6 can be impinged upon by the fluid (blood) to be measured via the receiving bore 12 tapering off in the area of the conical housing extension 35 from the side of the front end of the housing.

The arrangement shown in FIG. 3 greatly facilitates operations to be performed in connection with the periodical renewal of the electrolytic liquid and/or with the exchange of the membrane assembly. After loosening the clamp screw 34 and removing the electrode carrier 1 from the housing 32 it will suffice to pull the membrane bag 7, 29 off the shoulder 30 of the electrode carrier shaft 2, and to cleanse the electrode, whereupon a membrane bag 7, 29 filled with fresh electrolyte 11 is attached to the electrode carrier shaft 2 by merely shrinking it onto its shoulder 30 in such a manner as to provide a hermetic seal. Then the electrode carrier 1 is again inserted into the housing 32 and secured by means of a clamping screw 34. The arrangement is thus again ready for taking measurements.

FIG. 4 illustrates a variant of the membrane bag wherein the cylindrical sleeve 29' serving as a connecting member and the membrane 7' are separate members. The cylindrical sleeve 29' made of a resilient material, such as synthetic material, for example, presents an annular groove 36 on its outer surface, wherein the inner end of a thin-walled membrane 7' made of Teflon, for example, is inserted and attached to the sleeve 29' by means of a thread 37. The internal diameter of the sleeve 29' is slightly smaller than the external diameter of the housing shoulder 30, thereby ensuring a press fit for these members which makes for a positive sealing off of the electrolyte chamber at this point.

I claim:

1. Apparatus for measuring the partial pressures of gases, comprising:
   a cylindrical hollow housing having a stepped axial bore with an enlarged section and a tapered section at one end thereof;
   a stepped cylindrical shaft mounted in said enlarged section of said axial bore;
   an electrode mounted to said stepped shaft and having a sensitive end extending into said tapered portion of said axial bore;
   a reference electrode mounted to said stepped shaft and surrounding said electrode and spaced from said sensitive end;
   said shaft having a cylindrical section with a reduced diameter positioned between said reference electrode and the end of said shaft opposite said sensitive end;
   a liquid impermeable and gas permeable membrane for retaining a liquid electrolyte and surrounding said electrode and said reference electrode to establish electrical conductivity between said sensitive end and said reference electrode, said membrane
comprising a first section in the shape of a bag tapering in the direction of its closed end and stretched over said sensitive end, and a second cylindrically shaped sleeve section made of a resistant material attached to said first section, the free end of said sleeve having a diameter smaller than said reduced diameter of said cylindrical section and being stretched over said cylindrical section to provide the sole hermetic seal between said membrane and said shaft for retaining said liquid electrolyte.

2. Apparatus according to claim 1, wherein said bag and cylindrical sleeve are separate elements and the open end of said bag is attached over the outer surface of said cylindrical sleeve and further comprising means for securing the overlapping portions of said cylindrical sleeve and said bag to provide a hermetic seal therebetween.

3. Apparatus according to claim 2, wherein said cylindrical sleeve is made of polytetrafluoroethylene.

4. Apparatus according to claim 1, wherein said bag is integral with said cylindrical sleeve.

5. Apparatus according to claim 1, wherein said reduced diameter cylindrical shaft section includes a number of circumferential grooves, each of said circumferential grooves tapering in the direction of said sensitive end.

* * * * *